(12) United States Patent
Ito et al.

(10) Patent No.: US 7,928,341 B2
(45) Date of Patent: Apr. 19, 2011

(54) PASSENGER SEAT HAVING OCCUPANT DETECTOR FOR AUTOMOTIVE VEHICLE

(75) Inventors: Hiroyuki Ito, Chita (JP); Tsutomu Kamizono, Nagoya (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 524 days.

(21) Appl. No.: 11/825,098

(22) Filed: Jul. 3, 2007

(65) Prior Publication Data

US 2008/0011732 A1 Jan. 17, 2008

(30) Foreign Application Priority Data

Jul. 11, 2006 (JP) .................................. 2006-190848

(51) Int. Cl.
*H05B 1/02* (2006.01)
(52) U.S. Cl. ........................ 219/217; 219/202; 219/541
(58) Field of Classification Search .................. 219/217, 219/202–207, 494, 497
See application file for complete search history.

(56) References Cited

U.S. PATENT DOCUMENTS

| | | | |
|---|---|---|---|
| 6,255,790 | B1 | 7/2001 | Popp et al. |
| 6,283,504 | B1 | 9/2001 | Stanley et al. |
| 6,392,542 | B1 | 5/2002 | Stanley |
| 7,134,715 | B1 | 11/2006 | Fristedt et al. |
| 2001/0045733 | A1 | 11/2001 | Stanley et al. |
| 2003/0009273 | A1 | 1/2003 | Stanley et al. |
| 2004/0113634 | A1 | 6/2004 | Stanley et al. |
| 2005/0128082 | A1 | 6/2005 | Stanley et al. |
| 2007/0029768 | A1 | 2/2007 | Clos et al. |
| 2007/0159178 | A1 | 7/2007 | Stanley et al. |

FOREIGN PATENT DOCUMENTS

| | | |
|---|---|---|
| DE | 197 24 168 | 8/1998 |
| DE | 199 35 518 | 2/2001 |
| JP | 05-114460 | 5/1993 |
| JP | 06-138247 | 5/1994 |
| JP | 06-304091 | 11/1994 |
| JP | 07-180199 | 7/1995 |
| JP | 7-508233 | 9/1995 |
| JP | 10-262870 | 10/1998 |
| JP | 2004-175291 | 6/2004 |
| WO | WO 0192900 A1 * | 12/2001 |

(Continued)

OTHER PUBLICATIONS

Office action dated Oct. 24, 2008 in Chinese Application No. 2007 10130513.4 with English translation thereof.

(Continued)

*Primary Examiner* — Mark H Paschall
(74) *Attorney, Agent, or Firm* — Harness, Dickey & Pierce, PLC

(57) ABSTRACT

An electrode unit for detecting whether a seat is occupied or not (occupancy conditions) is embedded in a seat of an automotive vehicle together with an electrically powered seat heater. Both of the electrode unit and the seat heater are flat, and the electrode unit is laminated on the heat heater. The electrode unit is composed of an upper electrode, a lower electrode and an insulating film disposed between both electrodes. The occupancy conditions are detected based on changes in a capacitance between the upper electrode and a member grounded to a vehicle body. To reduce a capacitance between the upper electrode and seat heater and to thereby improve sensitivity of the detection of the occupancy conditions, an alternating voltage that alternates in accordance with an alternating voltage supplied to the upper electrode is supplied to the lower electrode.

17 Claims, 5 Drawing Sheets

FOREIGN PATENT DOCUMENTS

WO    WO 2004/080766      9/2004

OTHER PUBLICATIONS

Office action dated Oct. 12, 2009 in corresponding German Application No. 10 2007 031 031.7.

Office action dated Mar. 10, 2008 in German Application No. 10 2007 031 031.7 with English translation thereof.

Office action dated Sep. 28, 2010 in corresponding Japanese Application No. 2006-190848.

\* cited by examiner

US 7,928,341 B2

PASSENGER SEAT HAVING OCCUPANT DETECTOR FOR AUTOMOTIVE VEHICLE

CROSS-REFERENCE TO RELATED APPLICATION

This application is based upon and claims benefit of priority of Japanese Patent Application No. 2006-190848 filed on Jul. 11, 2006, the content of which is incorporated herein by reference.

BACKGROUND OF THE INVENTION

1. Field of the Invention

The present invention relates to a passenger seat device that includes a detector for detecting whether a seat is occupied, and to a method of manufacturing the same.

2. Description of Related Art

JP-A-2003-80989 proposes a device for detecting whether a passenger seat of an automotive vehicle is occupied or not. In this device, a passenger on the seat is detected based on changes in an alternating current electromagnetic field in the vicinity of the seat, particularly at a portion above the seat. This type of the detector is referred to as a capacitance-type detector. The detector includes a transmitting electrode embedded in the seat for forming the electromagnetic field and a receiving electrode embedded in a seat-back. A capacitive impedance between the transmitting electrode and receiving electrode decreases when a passenger occupies the seat. Thus, whether the seat is occupied or not is detected.

The capacitance-type detector described in JP-A-2003-80989 also includes a seat heater embedded in the seat at a position under the transmitting electrode (also referred to as a detecting electrode). When both of the seat heater and the occupant detector are embedded in a seat as in this example, the seat heater having a substantially constant potential under alternating current is positioned in the vicinity and under the detecting electrode.

In this detector, there is a problem that a large capacitance (referred to as a seat heater capacitance) is formed between the detector electrode and the seat heater because both are positioned close to each other, facing each other in a large area. An alternating current impedance for detecting a passenger is a compound impedance (mostly capacitance) composed of an impedance between the detecting electrode and a passenger and another impedance between the passenger and a vehicle body (a ground potential), both impedances being connected in series. Accordingly, the compound impedance becomes considerably large compared with an impedance due to the seat heater capacitance.

Since the compound impedance and the impedance due to the seat heater capacitance are connected in parallel to the detector electrode, detection sensitivity of the detector is considerably decreased due to presence of the heater impedance. In addition, the seat heater hinders flow of electric flux lines between a lower surface of the detecting electrode and a passenger due to a shielding effect of the seat heater. JP-A-2003-80989 proposes, to cope with these problems, to dispose a flat sheet electrode having a floating potential between the detecting electrode and the seat heater. However, it has been found out that the detecting sensitivity is hardly improved because the seat heater capacitance is little decreased by the presence of the sheet electrode having a floating potential.

SUMMARY OF THE INVENTION

The present invention has been made in view of the above-mentioned problem, and an object of the present invention is to provide an improved seat device having an occupant detector that has a high sensitivity even though it is embedded in a seat together with a seat heater. Another object of the present invention is to provide a method of manufacturing such a seat device.

The heater device according to the present invention includes an electrode unit embedded in a passenger seat in parallel to a seat heater. Both of the electrode unit and the seat heater are flat and laminated on each other. The electrode unit composed of an upper electrode, a lower electrode and an insulating film disposed between the upper and lower electrodes are positioned above the seat heater.

An alternating voltage having a predetermined frequency is supplied to the upper electrode, and a voltage altering according to the voltage supplied to the upper electrode is supplied to the lower electrode to reduce a capacitance between the upper electrode and the seat heater. Occupancy conditions, i.e., whether a passenger is seated on the seat and whether the seated person is an adult, a child or a child seat, are detected based on changes in a capacitance between the upper electrode and a member grounded to a vehicle body.

Since the capacitance between the upper electrode and the seat heater is reduced by supplying to the lower electrode the voltage changing according to the voltage supplied to the upper electrode, the occupancy conditions are accurately and surely detected based on changes in the capacitance between the upper electrode and the member grounded to the vehicle body. An alternating voltage may be supplied between the upper electrode and the lower electrode.

A heater-electrode unit that includes the electrode unit and the seat heater may be integrally formed, and then the heater-electrode unit may be embedded in the seat. In this manner, the seat device is efficiently manufactured. The seat heater may be embedded also in a seat-back (a vertical portion) in addition to a horizontal portion of the seat.

According to the present invention, the occupancy conditions are accurately detected with a high sensitivity without being disturbed by the capacitance between the upper electrode and the seat heater. Other objects and features of the present invention will become more readily apparent from a better understanding of the preferred embodiment described below with reference to the following drawings.

DETAILED DESCRIPTION OF THE PREFERRED EMBODIMENTS

Figure 1:
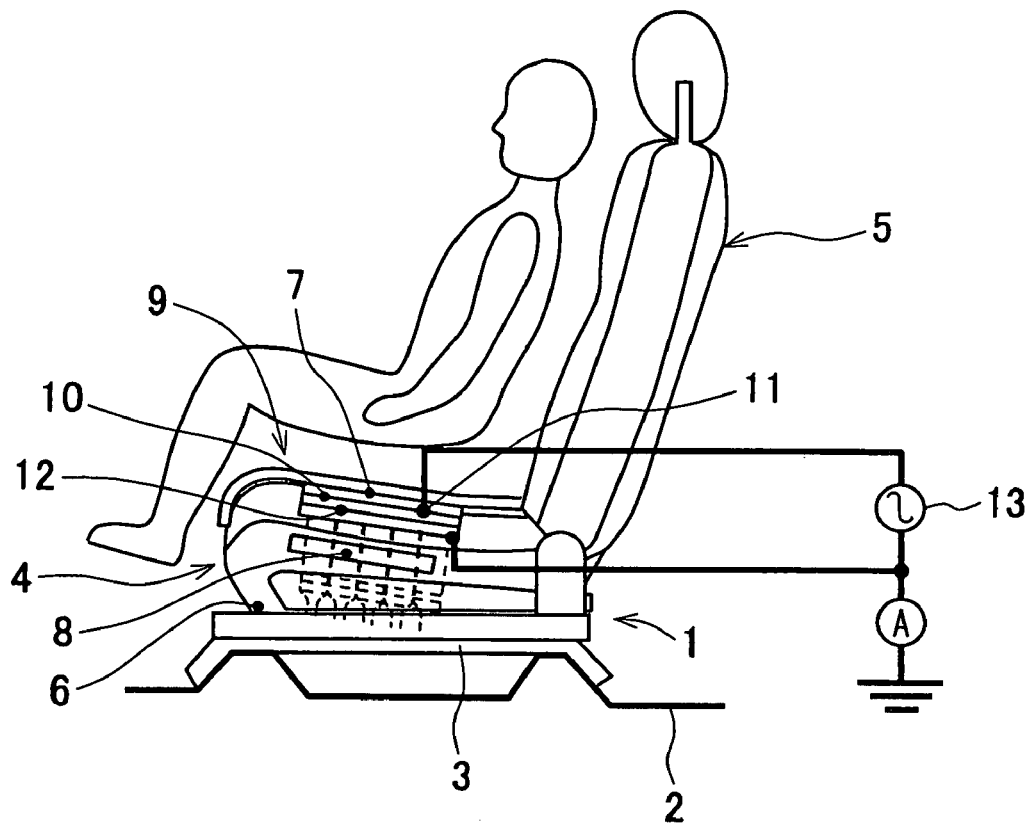
FIG. 1 is a schematic cross-sectional view showing a seat device having an occupant detector according to the present invention.

A first embodiment of the present invention will be described with reference to FIGS. 1 and 2. First, referring to FIG. 1, a seat device 1 having an occupant detector will be described. The seat device 1 is positioned on a metallic frame 3 of a floor 2 of an automotive vehicle. The passenger seat is composed of a seat 4 and a seat-back 5 that supports a passenger's back.

The seat 4 includes a cushion pad 6 made of a material such as hard foam-urethane fixed to the frame 3, a cushion cover 7 covering an upper surface of the cushion pad 6, a seat heater 8 embedded in the cushion pad substantially in parallel to the seat surface, and an electrode unit 9 disposed between the cushion cover 7 and the seat heater 8. The seat heater 8 is made of a sheet having a plane electric resistor or plural resistor wires and is disposed substantially in parallel to the seat surface. The seat heater 8 may be extended to the seat-back 5. Heating power is supplied to the seat heater 8 from a direct current power source such as an on-board battery. It is also possible to heat the seat heater 8 with alternating current such as three-phase alternating current generated in an alternator driven by the engine.

The electrode unit 9 is composed of an insulating film 10, an upper electrode 11 disposed on an upper surface of an insulating film 10 and a lower electrode 12 disposed on a lower surface of the insulating film 10. The insulating film 10 may be made of a resin material such as polyethylene-terephthalate (PET) having a thickness of about 1 mm. The electrode unit 9 is disposed immediately underneath the cushion cover 7, and the seat heater 8 is disposed under the electrode unit 9 several millimeters apart therefrom. As a distance between the seat heater 8 and the electrode unit 9 becomes larger, a parasitic capacitance formed between them becomes smaller. However, a distance between the seat surface and the seat heater 8 increases.

Figure 2:
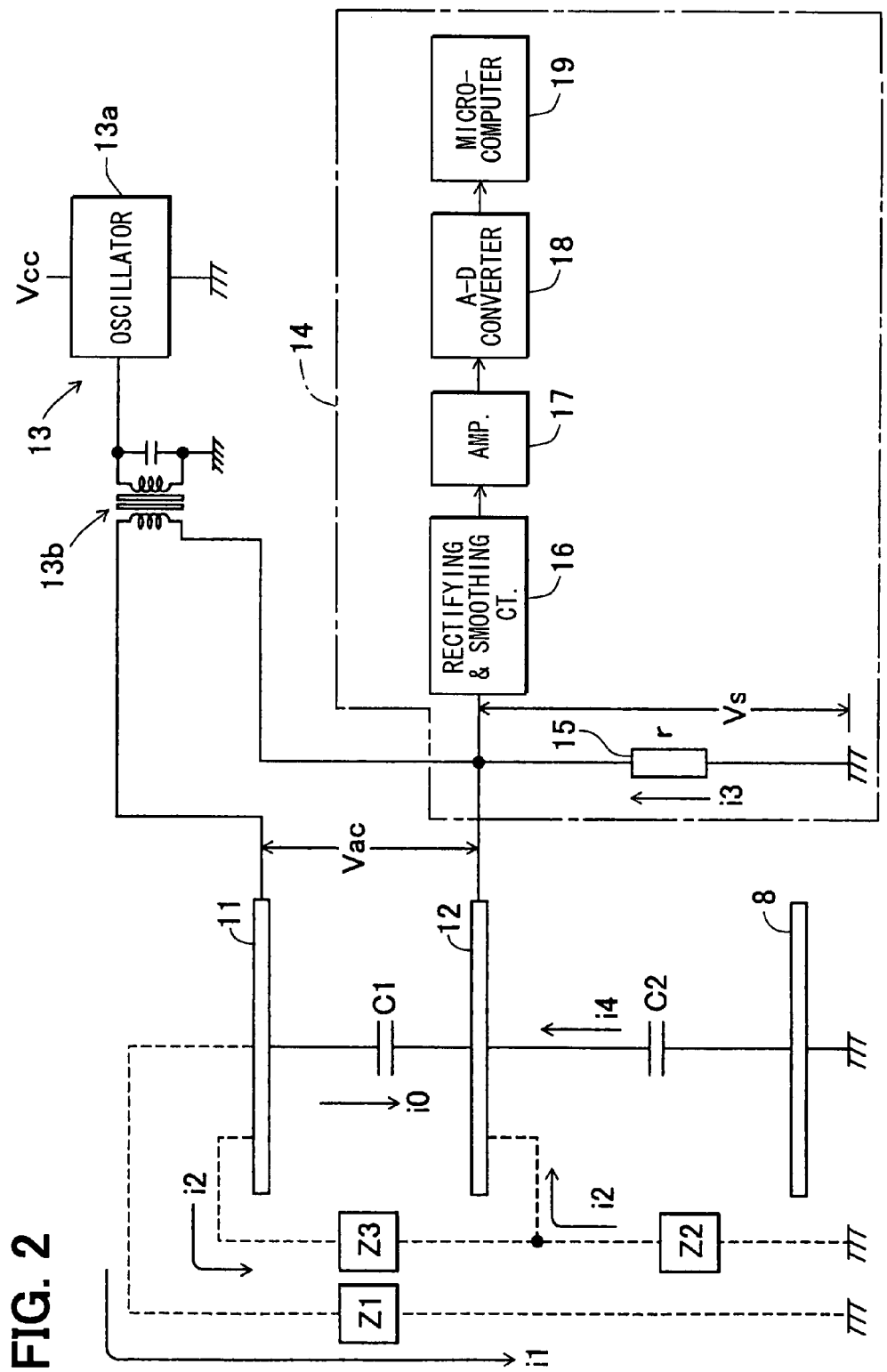
FIG. 2 is a block diagram showing electric connections in the occupant detector as a first embodiment of the present invention.

With reference to FIG. 2, an electric circuit in the seat device 1 will be explained. An alternating voltage (AC-voltage) Vac having a proper frequency, e.g., several tens to several hundreds kHz, is supplied between the upper electrode 11 and the lower electrode 12 from an AC power source 13. The AC power source 13 is composed of an oscillator 13$a$ and an insulating transformer 13$b$. The electric circuit shown in FIG. 2 is an example, and this may be variously changed.

An occupant detector 14, as shown in FIG. 2, includes a resistor 15 for detecting current flowing therethrough, a rectifying and smoothing circuit 16, an amplifier 17, an analog to digital converter (A-D converter) 18 and a microcomputer 19. An equivalent electric circuit in the seat device 1 when the alternating voltage Vac is supplied between the upper electrode 11 and the lower electrode 12 will be explained with reference to FIG. 2. C1 represents a capacitance between the upper electrode 11 and the lower electrode 12, and C2 represents a capacitance between the lower electrode 12 and the seat heater 8.

The seat heater 8 can be regarded as being substantially grounded (for alternating current). An impedance Z1 is an impedance between the upper electrode 11 and the ground on the vehicle body. The impedance Z1 is substantially a capacitance component, but it includes a small amount of resistance component when a passenger is seated on the seat. An impedance Z2 is an impedance between the lower electrode 12 and the ground. The impedance Z2 is substantially a capacitance component, but it includes a small amount of resistance component when a passenger is seated. The impedances Z1, Z2 change according to occupancy conditions, i.e., whether the seat is occupied or not. An impedance Z3 between the upper electrode 11 and the lower electrode 12 also changes depending on whether the seat is occupied or not.

When the seat is occupied by a passenger, the impedances Z1, Z2 and Z3 decrease. Since the upper electrode 11 is the closest to the occupant, the lower electrode 12 is next to the upper electrode 11, and the seat heater 8 is farthest from the occupant, an amount of impedance decrease in Z1 and Z2 is larger than that in Z3. This means that an amount of current increase in i1 and i2 due to seat occupancy is larger than that in i3. According to impedance decrease in Z1 and Z2, the current i1 and i2 flowing out of the upper electrode 11 increase. This causes an increase in current i3 flowing through the resistor 15, resulting in increase in a voltage drop Vs (=r×i3) across the resistor 15.

The voltage drop Vs is a signal voltage indicating occupancy conditions. The signal voltage Vs is rectified and smoothed in the circuit 16, amplified in the amplifier 17 and converted into a digital signal in the A-D converter 18. The digital signal is fed to the microcomputer 19. The microcomputer 19 determines that the seat is occupied if the digital signal exceeds a predetermined level. It is also possible to determine whether the occupant is an adult or a child, or whether a child seat is positioned on the seat according to the level of the digital signal.

Figure 3:
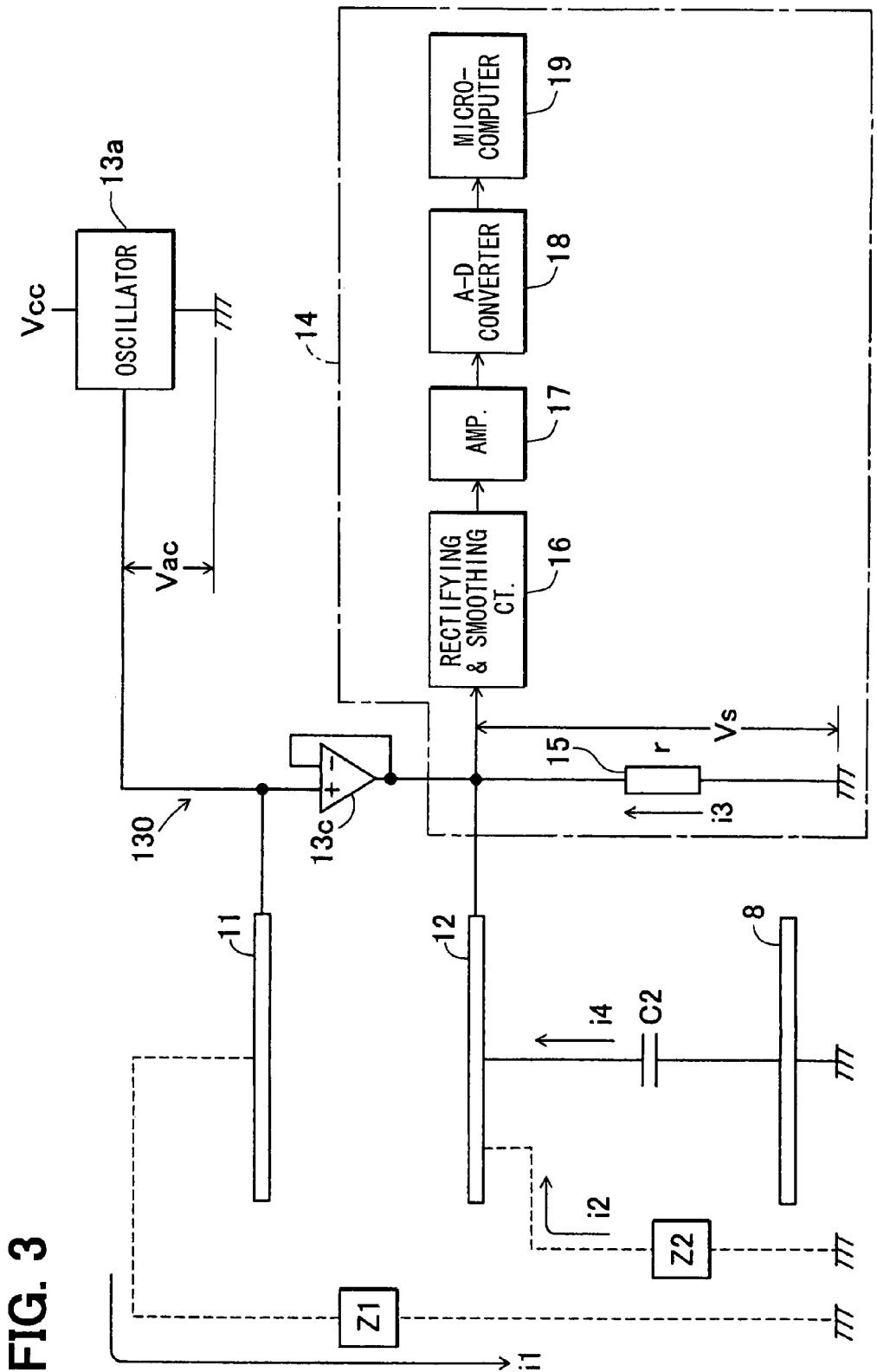
FIG. 3 is a block diagram showing electric connections in the occupant detector as a second embodiment of the present invention.

A second embodiment of the present invention will be described with reference to FIG. 3. In this embodiment, the alternating power source 13 of the first embodiment is replaced with a power source 130. The power source 130 is composed of a oscillator 13$a$ and a voltage follower circuit 13$c$. Other structures are the same as those of the first embodiment. An alternating voltage Vac is supplied to the upper electrode 11, and a voltage, which is made substantially equal to the voltage Vac through the voltage follower circuit 13$c$, is supplied to the lower electrode 12. In this manner, the impedance Z3 can be neglected. When the seat is occupied, the impedance Z1 decreases, causing increase in current i1. The increase in i1 results in increase in i3 and increase in a signal voltage Vs. In the second embodiment, an amount of changes in the signal voltage Vs due to occupancy of the seat can be made larger than that in the first embodiment.

Figure 4:
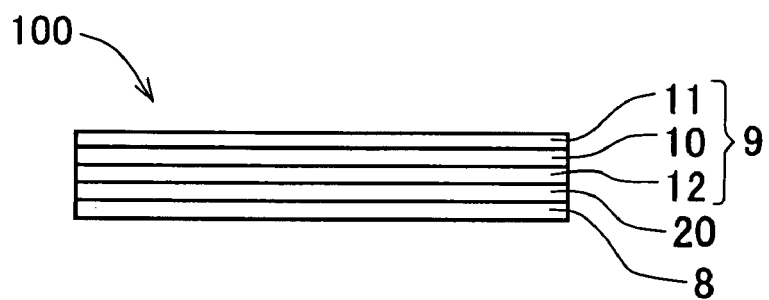
FIG. 4 is a schematic cross-sectional view showing a heater-electrode unit used in the occupant detector as a third embodiment of the present invention.

A third embodiment of the present invention will be described with reference to FIG. 4. In this embodiment, a heater-electrode unit 100 is embedded in the seat. Other structures and functions are the same as those of the first embodiment. The heater-electrode unit 100 includes: the electrode unit 9 composed of the upper electrode 11, the insulating film 10 and a lower electrode 12; a seat heater 8; and an insulating layer 20 disposed between the electrode unit 9 and the seat heater 8. All of these components are integrally formed in the heater-electrode unit 100 as a single body. The insulating film 10 and the insulating layer 20 may be made of the same material having the same thickness. However, it is preferable to form the insulating layer 20 with a material having a lowest possible relative dielectric constant and a thickness thicker than that of the insulating film 10. This results in decrease in capacitance C2 and increase in an amount of changes in the signal voltages Vs due to occupancy. The heater-electrode unit 100 formed as an integral body is assembled in the seat. This makes a process of manufacturing the seat device 1 simple.

Figure 5:
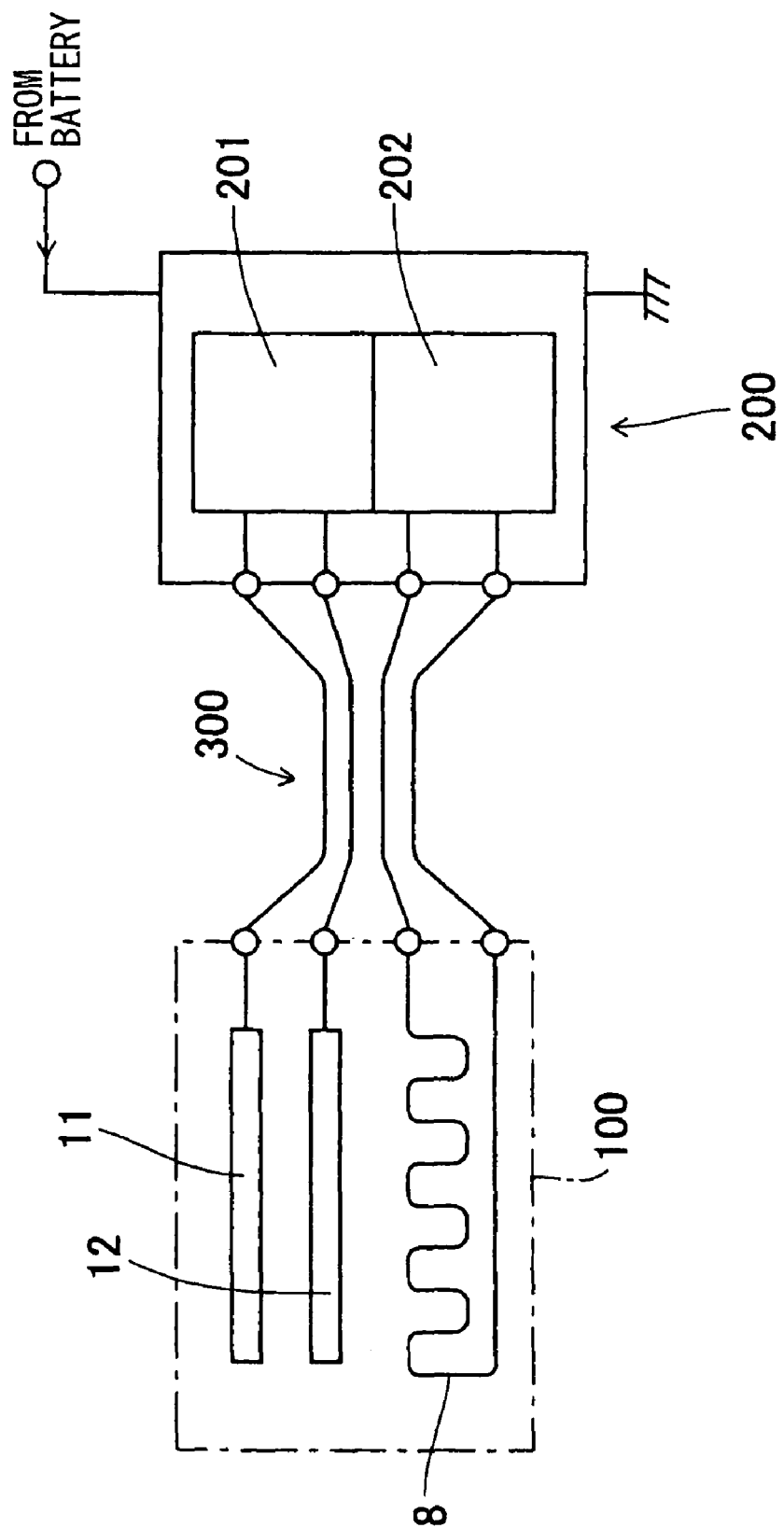
FIG. 5 is a circuit diagram showing a power supply system in the seat device as a fourth embodiment of the present invention.

A fourth embodiment of the present invention will be described with reference to FIG. 5. In this embodiment, the heater-electrode unit 100 and an electric circuit block 200 including an occupant detector 201 and a heater controller 202 are electrically connected through a wiring harness 300. The occupant detector 201 includes the alternating power source 13 or 130 and the detector circuit 14. The wiring harness 300 is composed of four insulated wires integrally bound. A grounding wire may be separately provided from the wiring harness 300. By making electrical connections in this manner, a process of making the seat device 1 is further simplified. Other structures are the same as those of the foregoing embodiments.

Figure 6:
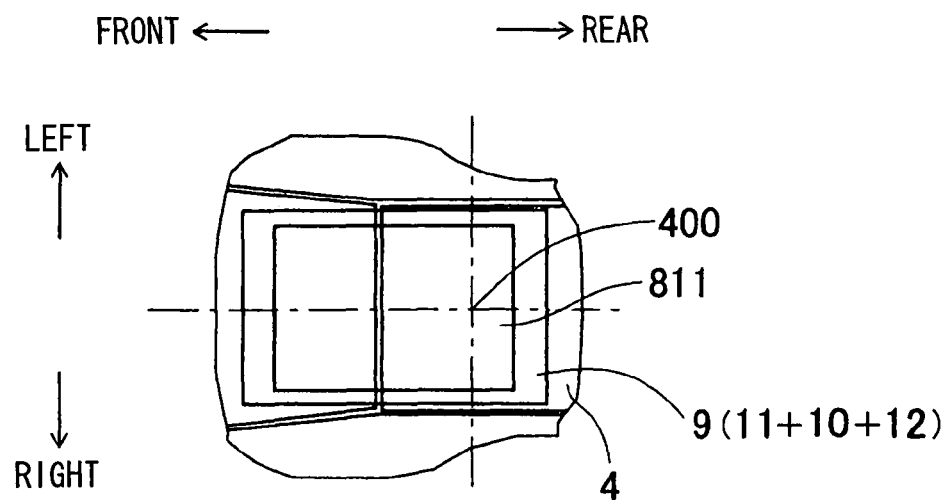
FIG. 6 is a schematic view showing a passenger seat having an occupant detector as a fifth embodiment of the present invention.

A fifth embodiment of the present invention is shown in FIG. 6. A hip-point where a center of a passenger is positioned is denoted by 400. The seat heater 8 is made smaller than the electrode unit 9 in this embodiment. In other words, the seat heater 8 is completely covered by the electrode unit 9. In this manner, suppression of a potential change in the electrode unit 9 due to the seat heater 8 acting as a substantially constant potential body can be reduced. The electrode unit 9 and the seat heater 8 may be separately formed. The upper electrode 11 and the lower electrode 12 may be separately made.

Figure 7:
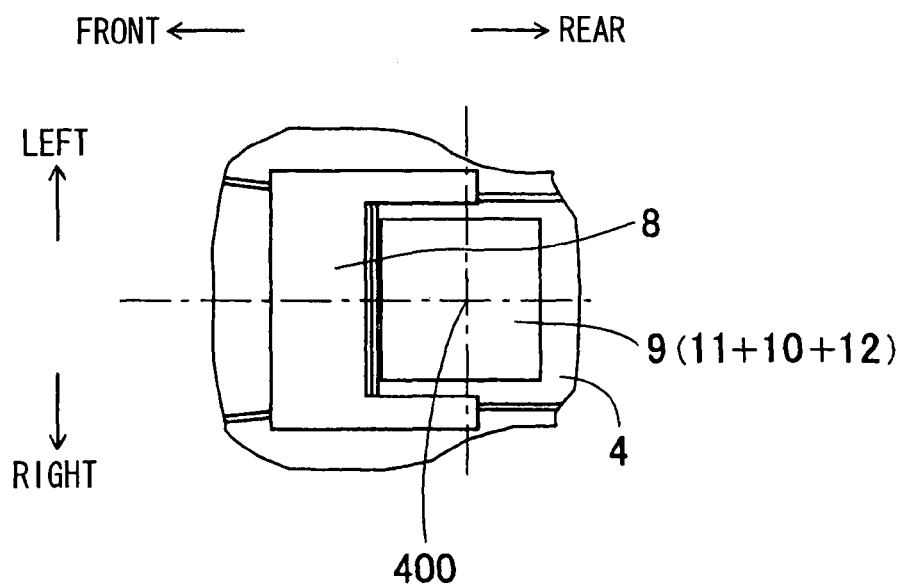
FIG. 7 is a schematic view showing a passenger seat having an occupant detector as a sixth embodiment of the present invention.

A sixth embodiment of the present invention is shown in FIG. 7. This embodiment is a modified form of the fifth embodiment. In this embodiment, the seat heater 8 is positioned not to overlap the electrode unit 8. In this manner, the parasitic capacitance between the electrode unit 9 and the seat heater 8 can be considerably reduced. It is preferable to position the electrode unit 9 exactly underneath the hip-point 400 to obtain a larger change in signal voltage due to seat occupancy.

The present invention is not limited to the embodiments described above, but it may be variously modified. For example, though the load of the alternating voltage source is formed as a resistance-capacitance circuit (CR circuit) in the foregoing embodiments, it is possible to form the load as a circuit including an inductance (LCR circuit). The inductance may be formed by a coil connecting the upper electrode 11 to the lower electrode 12. In the LCR circuit, a larger change in the signal voltage Vs can be obtained at a vicinity of a series or parallel resonant frequency.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A passenger seat device for an automotive vehicle, comprising:
    a seat heater that is embedded in a seat in parallel to a seat surface, electric current being supplied to the seat heater in a controlled manner from an on-board power source;
    an upper electrode that is embedded in the seat above the seat heater in parallel thereto;
    an alternating current power source that supplies an alternating voltage having a predetermined frequency to the upper electrode; and
    a detector that detects occupancy conditions of the seat based on changes in a capacitance between the upper electrode and a member grounded to a body of the automotive vehicle;
    a lower electrode embedded in the seat between the upper electrode and the seat heater in parallel thereto; wherein
    the upper electrode and the lower electrode are fixed directly to an upper surface and a lower surface, respectively, of an insulating film to form an integrated electrode unit;
    the insulating film has a generally constant thickness to maintain a generally constant distance between the upper electrode and the lower electrode; and
    the alternating current power source supplies to the lower electrode a shielding alternating voltage that changes in accordance with the alternating voltage supplied to the upper electrode.

2. The passenger seat device as in claim 1, wherein:
    the alternating current power source supplies an alternating voltage between the upper and the lower electrodes.

3. The passenger seat device as in claim 1, wherein:
    the alternating current power source includes a current-buffer circuit having a low output impedance for supplying to the lower electrode a potential following potential changes of the upper electrode.

4. The passenger seat device as in claim 1, wherein:
    at least one of the upper electrode and the lower electrode entirely covers the seat heater along a surface of the seat.

5. The passenger seat device as in claim 1, wherein:
    the occupancy conditions include whether the seat is occupied or not and types of an occupant.

6. The passenger seat device as in claim 1, wherein:
    the seat heater is also embedded in a seat-back of the seat.

7. The passenger seat device as in claim 1, further comprising an insulating layer attached directly to a lower surface of the lower electrode, the seat heater being attached directly to a lower surface of the insulating layer to form an integral heater-electrode unit.

8. The passenger seat device as in claim 7, wherein a thickness of the insulating layer is greater than a thickness of the insulating film.

9. The passenger seat device as in claim 8, wherein a dielectric constant of the insulating layer is lower than a dielectric constant of the insulting film.

10. The passenger seat device as in claim 7, wherein a dielectric constant of the insulating layer is lower than a dielectric constant of the insulting film.

11. A method of manufacturing a passenger seat for an automotive vehicle, the passenger seat having a seat heater embedded therein, an upper electrode embedded in the seat above the seat heater in parallel thereto, a lower electrode embedded in the seat between the upper electrode and the seat heater in parallel thereto, an alternating current power source for supplying alternating voltage having a predetermined frequency to the upper electrode, and a detector for detecting occupancy conditions of the seat based on changes in a capacitance between the upper electrode a member grounded to a body of the vehicle, the method comprising:
    providing an insulating film;
    forming an integral electrode unit by attaching the upper electrode directly to an upper surface of the insulating film and attaching the lower electrode directly to a lower surface of the insulating film;
    providing an insulating layer between the lower electrode and the heater;
    embedding the heater and the integral electrode unit in the passenger seat.

12. The method of manufacturing a passenger seat as in claim 11, wherein:
    a wire harness including wires connecting the upper electrode to the alternating current power source and to the detector and another wire harness including wires for supplying power to the seat heater are formed integrally at least at a portion of both wire harnesses.

13. The method of manufacturing a passenger seat as in claim 11, wherein:

wires for supplying power from an on-board battery to the seat heater are commonly used as wires for supplying power to the alternating current power source.

14. The method of manufacturing a passenger seat according to claim 11, further comprising:

forming an integral heater-electrode unit by attaching the insulating layer directly to a lower surface of the lower electrode and attaching the heater directly to a lower surface of the insulating layer; wherein the embedding step comprises embedding the integral heater-electrode unit in the passenger seat.

15. The passenger seat device as in claim 14, wherein a thickness of the insulating layer is greater than a thickness of the insulating film.

16. The passenger seat device as in claim 15, wherein a dielectric constant of the insulating layer is lower than a dielectric constant of the insulting film.

17. The passenger seat device as in claim 14, wherein a thickness of the insulating layer is greater than a thickness of the insulating film.

* * * * *